April 7, 1964
J. P. KERN
3,127,743
FLUID TANK PRESSURIZING SYSTEM
Filed Dec. 28, 1961
2 Sheets-Sheet 1
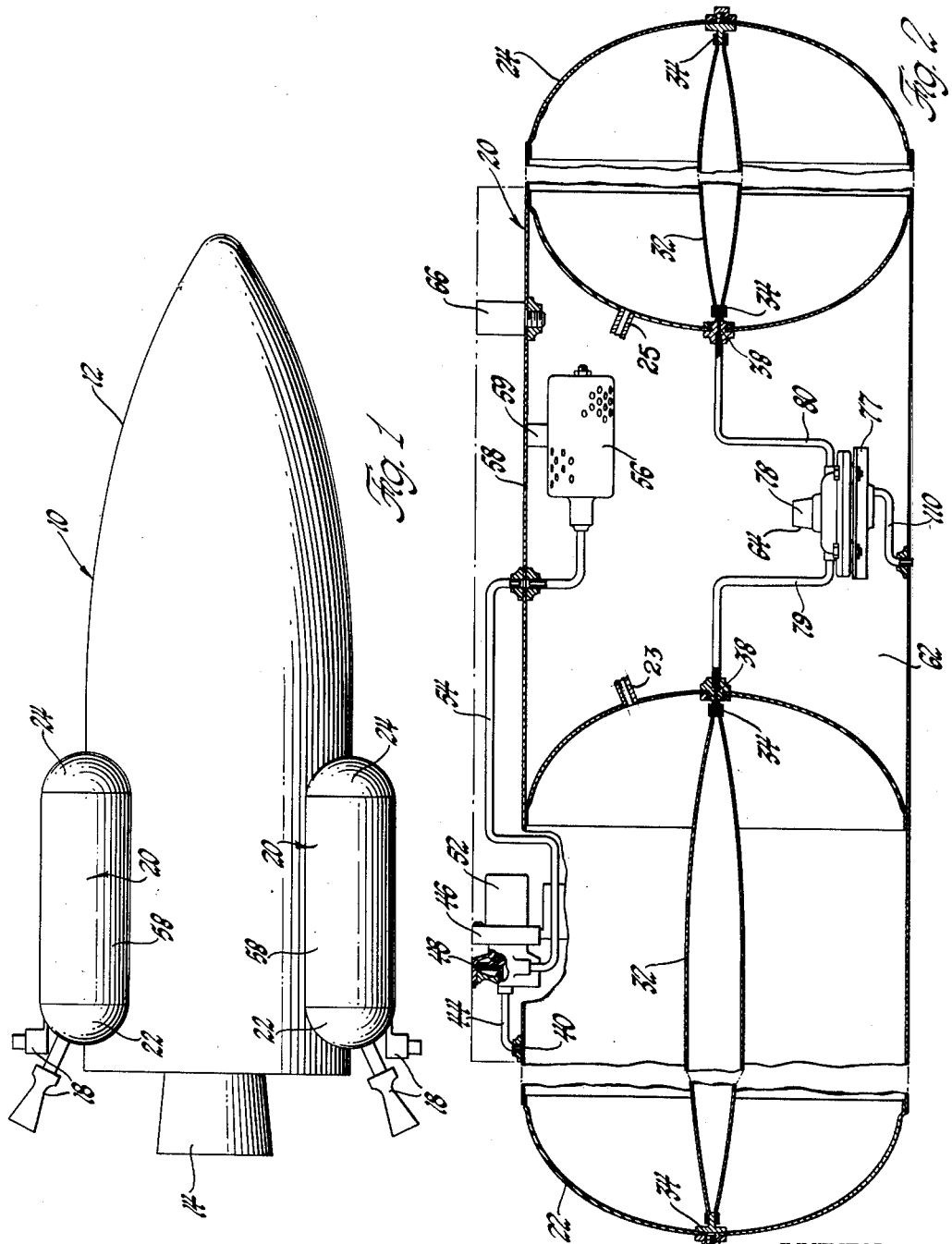
INVENTOR.
James P. Kern
BY
Robert E. McCollum
ATTORNEY April 7, 1964

J. P. KERN 3,127,743

FLUID TANK PRESSURIZING SYSTEM

Filed Dec. 28, 1961

INVENTOR.
James P. Kern
BY
Robert E. McCollum
ATTORNEY

United States Patent Office 3,127,743
Patented Apr. 7, 1964

3,127,743
FLUID TANK PRESSURIZING SYSTEM
James P. Kern, Indianapolis, Ind., assignor to General Motors Corporation, Detroit, Mich., a corporation of Delaware
Filed Dec. 28, 1961, Ser. No. 162,822
1 Claim. (Cl. 60—39.48)

This invention relates to a system and apparatus for pressurizing the fluid in a tank, and more particularly to one generating a pressurizing gas from the fluid contained in the tank.

In chemical liquid fuel burning rocket engines or the like, for example, where weight is of primary importance, and the fuel and oxidizer must be carried in separate tanks, a problem exists as to how to efficiently pressurize the fuel and oxidizer for delivery into the rocket engine combustion chamber. Having to carry a separate pressurizing gas tank would not solve the problem since the tank would necessarily be large and weighty producing additional drag on the engine thereby lowering its efficiency. Also, it would be impractical to pack the pressurizing apparatus in the tanks themselves because the size of the tanks would necessarily have to be quite large to contain it, adding still more weight and drag to the engine.

This invention eliminates the above disadvantages by providing a fluid pressurizing system wherein the fluid carried in the tank acts as its own pressurizing agent by having a portion thereof combined with a reactant to produce high pressure gas acting against the fluid.

Therefore, it is an object of this invention to provide a system and apparatus for pressurizing the fluid in a closed tank.

It is a further object of the invention to provide a fluid tank pressurizing system wherein the fluid carried in the tank acts as its own pressurizing agent.

It is a still further object of the invention to provide a system and apparatus for pressurizing the fuel and oxidizer tanks of a liquid rocket propulsion system, the system chemically combining a portion of the oxidizer or fuel with a solid reactant to produce a gaseous product adapted to be discharged into the tanks to act against the fluids therein.

Other objects, features and advantages of the invention will become apparent upon reference to the succeeding detailed description of the invention and to the drawings illustrating the preferred embodiment thereof; wherein, FIGURE 1 is a schematic illustration of a missile embodying the invention;

FIGURE 2 is an enlarged cross sectional view of details of FIGURE 1;

Figure 3:
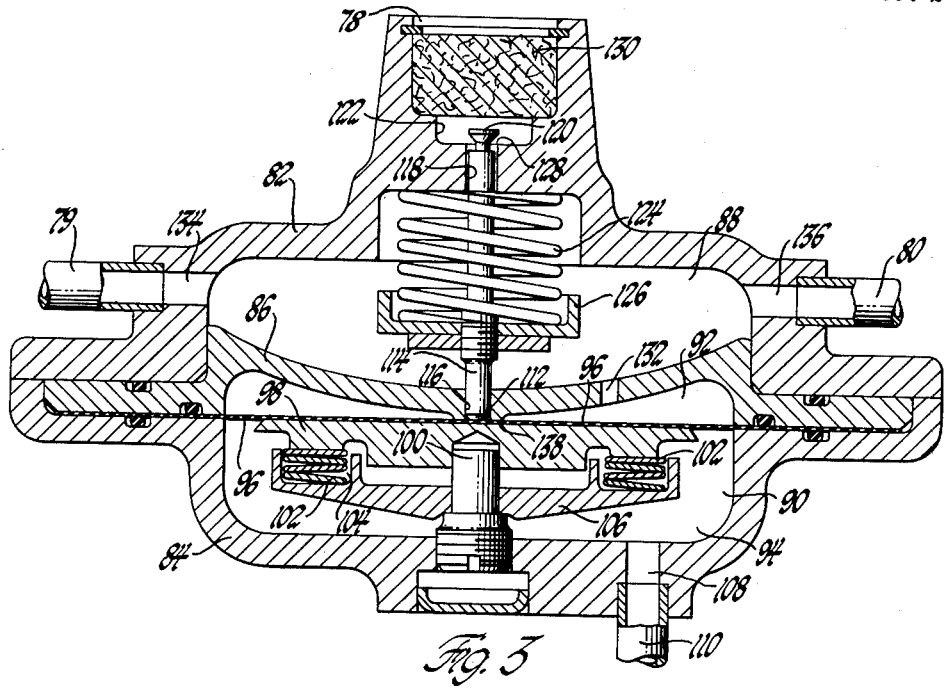
FIGURE 3 is an enlarged cross sectional view of a detail of FIGURE 2.

In general, the invention relates to a system and apparatus for pressurizing the liquid fuel and oxidizer tanks of a liquid propulsion rocket motor so that the fuel and oxidizer are discharged from the tanks at the proper pressure. The system includes a gas generator chemically combining a portion of the liquid oxidizer with a solid reactant to produce a gas in the space between the tanks. The gas is fed into a bladder member in each of the tanks to expand it against the fuel and oxidizer pressurizing them to the desired level. A pressure regulator valve maintains this pressure level in the bladders. When the bladder pressure drops, the regulator valve opens to admit more gas from the space between the tanks. If the gas pressure in the space is too low, a pressure responsive switch activates a pump to supply fuel or oxidizer to the generator to generate more gas. Thus, a drop in fuel or oxidizer pressure below the desired operating level causes the gas generator to produce the gas necessary to expand the bladder to raise the pressure of the fuel and oxidizer in the tanks.

More specifically, FIG. 1 shows the invention installed in a liquid fuel propulsion rocket engine 10 having an annular casing 12 and a main exhaust nozzle 14. In this particular installation, the rocket engine has four attitude control nozzles 18 intermittently providing side thrust forces about the center of gravity of the missile to maintain it on its scheduled flight path. The fuel for these latter nozzles is carried in separate enclosures 20 secured to the engine, the enclosures each surrounding portions of separated liquid fuel and oxidizer tanks 22 and 24 as shown in FIGURE 2. The tanks 22 and 24 have outlets 23 and 25, respectively, which connect the tanks to the nozzle combustion chambers (not shown).

Each of the tanks 22 and 24 has a disc shaped thin metal bellows or bladder 32 secured internally to the tank by an annular ring flange type of fitting 34 sealing the bladder. Each of the fittings 34 of each tank has a radial fluid passage 38 through one portion to admit a pressurizing gas to the bladder to expand it against the fuel or oxidizer in the tank. The source of the pressurizing gas and the controls for maintaining the bladder pressure at the proper level are as follows.

The oxidizer tank 22 has an opening 40 into which is fitted a conduit 44 connected at its opposite end to the inlet of a centrifugal type pump 46. The pump is secured to the tank 22 by any suitable means not shown, and is a known type having an impeller 48 driven by an electric motor indicated schematically at 52. The details of the pump are known and are believed to be unnecessary for an understanding of the invention, and therefore are not given. Furthermore, it will be understood that other types of pumps could be used without departing from the scope of the invention. The pump impeller 48 draws liquid oxidizer from tank 22 and discharges it through a line 54 into the inlet of a gas generator 56.

Figure 4:
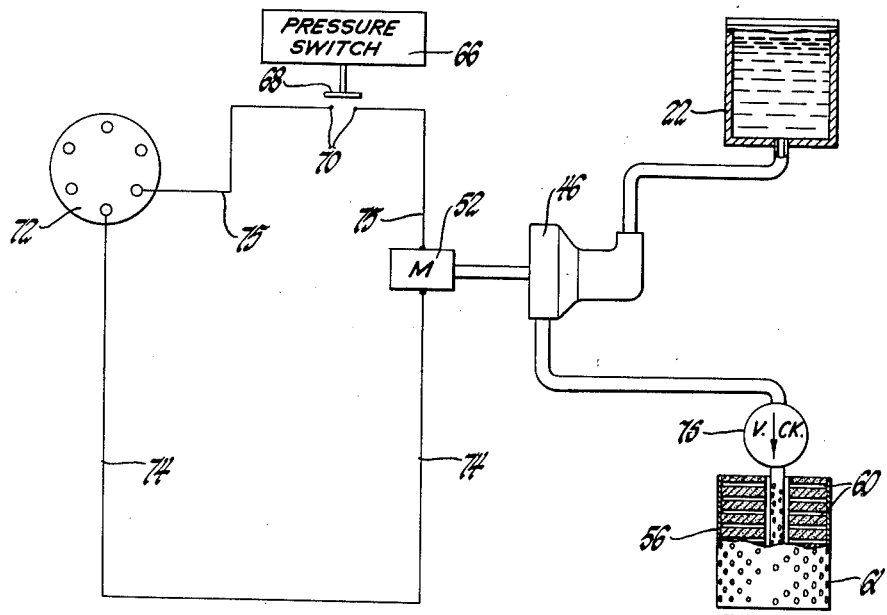
FIGURE 4 is a schematic wiring diagram of the controls for the elements shown in FIGURE 2.

The gas generator is secured within enclosure 20 and is supported from its casing 58 by a strut 59. It may be of a known type having, for example, stacks of a solid reactant such as carbon plates 60 (FIGURE 4) separated to permit the flow of oxidizer between. The carbon reacts instantaneously with the oxidizer, which may be nitrogen tetroxide, for example, to produce a gaseous reaction product such as carbon dioxide and nitrogen. The gas is discharged through apertures 61 in the generator housing into the chamber 62 defined by the space between the tanks 22 and 24 and casing 58. As will be described later, the gas developed by generator 56 is adapted to be delivered through a pressure regulator valve 64 to the bladder 32 of each tank to expand it to raise the fuel or oxidizer pressures in the tanks to the desired level.

Pump 46 is not operated continuously but only intermittently. This is done so that only that amount of oxidizer will be bled from the tank to the gas generator that is necessary to produce a gas pressure in chamber 62 equal to or above the pressure level to be maintained in each of the bladders. In other words, the pump and generator operate to keep the chamber 62 filled with gas at, say, a pressure of at least 200 p.s.i., for example, so that a pressure drop in the bladders below 200 p.s.i. can be made up by adding higher pressure gas from the chamber.

To this end, a gas pressure responsive switch 66 is secured to casing 58 and projects into chamber 62. The switch is electrically connected (FIGURE 4) to motor 52 to energize or deactivate it depending upon the position of the switch. The switch is shown only schematically since the details are believed to be unnecessary for an understanding of the invention. It has a contact arm 68 spring biased to a position closing a set of contacts 70 below a gas pressure of 200 p.s.i. in chamber 62 to complete a circuit to motor 52, and is movable above a 200 p.s.i. chamber gas pressure to open the contacts. The circuit need be only that necessary to provide an energizing force to drive motor 52, and is, therefore, shown only schematically in FIGURE 4. It consists of a power source 72 connected to one side of the motor 52 by wiring 74, and to the opposite side of the motor by wiring 75 in which the switch contacts 70 are located. Closing the switch therefore drives pump 46. The pump then draws oxidizer from tank 22 and discharges it into the gas generator 56 through a check valve 76.

The construction described maintains the gas pressure in chamber 62 at a minimum level of 200 p.s.i. To prevent pressure overshoots by the gas generator, the pump 46 is chosen of such a size that the back pressure on the pump limits the delivery thereof. However, the chamber pressure may often be greater than the minimum level because the gas generator will be filled with oxidizer at the time the pressure switch 66 deactivates the pump, and the generation of gas will continue until the oxidizer is used up. If at this time the bladers were connected directly to chamber 62, then the pressures of the oxidizer and fuel would rise above the desired level to a point where the tanks could crack or even burst. The pressure regulator valve 64 prevents this by preventing a build up of pressure in the bladders above the desired level, which, in this case has been chosen as 200 p.s.i.

The regulator valve is secured within casing 58 by means of a flange support 77, and may be of any known type regulating the supply of gas to the bladders at the desired pressure level. In general, the valve has an inlet 78 receiving the gas in chamber 62, and two outlet lines 79 and 80. The outlet lines discharge the gas into the bladders of each tank through the fluid passages 38 in the tank fittings 34. More specifically, FIGURE 3 shows the valve as consisting of a valve body having two dish-shaped portions 82 and 84. The two portions are joined to each other and to an arcuately curved partition 86 dividing the interior of the valve body into two chambers 88 and 90. Chamber 90 is further subdivided into two compartments 92 and 94 by a thin flexible diaphragm 96 secured in the housing. A disc shaped actuator 98 abuts one side of the diaphragm and is slidably supported on a pin 100 projecting radially from the housing. The actuator 98 is resiliently biased against the diaphragm by four Belleville type springs 102 seated in an annular retainer portion 104 of a disc 106 fixed to pin 100. Chamber 94 is at ambient pressure by being vented outboard of the engine through a port 108 and a line 110 (FIGURE 1). The size and strength of the springs 102 in this particular instance are chosen so as to exert a total pressure of 200 p.s.i. against actuator 98.

Diaphragm 96 is abutted on its side in chamber 92 by the end 112 of a valve actuating stem 114. Stem 114 extends slidably through a bore 116 in partition 86, through chamber 88, and loosely through a radial bore 118 in the valve housing portion 82. The stem has a frusto-conically shaped valve 120 secured to it, the valve being movable in a bore 122 open to the gas in chamber 62. A compression spring 124 is inserted between the housing and an annular retainer 126 secured to stem 114, the spring biasing the stem in a direction to seat valve 120 against the shoulders 128 of bore 118 to control the flow of gas from chamber 62 through a filter 130. The force exerted by the spring 124 is chosen to be of a value just sufficient to seat the valve in the absence of other forces acting on stem 114 so as not to interfere with the operation of the Belleville springs 102. Any gas in chamber 88 is bled into chamber 92 through a number of metered holes 132 in partition 86 to act on diaphragm 96. Chamber 88 has two gas discharge ports 134 and 136 at opposite sides into which are fitted the conduits 79 and 80.

In the operation of the regulator valve as a whole, if the gas pressure in discharge ports 134 and 136 is less than 200 p.s.i., the springs 102 will position the parts as shown in FIGURE 3 by moving actuator 98 and diaphragm 96 against a boss 138 on partition 86. Stem 114 is thus moved upwardly against the force of spring 124 moving valve 120 off its seat. The higher pressure gas in chamber 62 can therefore enter chamber 88 through bore 118 passing around the stem 114 and through ports 132 to act against the diaphragm 96. When the gas pressure in chamber 92 reaches 200 p.s.i., the force of springs 102 will be balanced. Spring 124 then seats valve 120 by moving stem 114 downwardly moving the diaphragm and actuator 98 to compress springs 102. The supply of gas to chamber 88 is thus shut off, and the pressure in chambers 88 and 92 remains at 200 p.s.i. If the pressure should fall below 200 p.s.i., the force of the Belleville springs 102 moves the actuator 98 and diaphragm 96 and stem 114 upwardly, unseating valve 120 to again permit higher pressure gas in chamber 62 to enter chamber 88. The lines 79 and 80 leading to the bladders in each tank therefore are maintained filled with gas at a pressure of 200 p.s.i. The metered ports 132 prevents the valve from hunting back and forth due to slight fluctuations in pressure level by acting as a time delay before a pressure drop is sensed against the diaphragm.

The operation of the entire system is believed to be clear from the above description and therefore will not be given in detail. Initially, the tanks are filled with liquid fuel and oxidizer, collapsing the bladders 32. Chamber 62 being at zero pressure, switch 66 activates pump 46 to draw oxidizer from tank 22 and discharge it into the gas generator 56. The gas produced fills chamber 62 and flows through the regulator valve 64 to fill bladders 32. With continued generation of gas, the bladder and tank pressures rise until the bladder pressure and the pressure in chamber 62 reaches 200 p.s.i. Both the regulator valve 64 and pressure switch 66 then close stopping the pump 46. The generator 56 continues to generate gas until all the oxidizer in the generator is used up raising the pressure in chamber 62 still higher. Therefore, whenever the bladder gas pressure falls below 200 p.s.i., gas is supplied to make up for the pressure drop. If the pressure in chamber 62 is too low, more gas is generated.

The bladder pressure could drop for a number of reasons, the main one being, of course, as a result of supplying fuel and oxidizer to the attitude control nozzles 18. Also, since the liquid oxidizer and fuel are generally cold, the transfer of heat through the bladders from the gas to the oxidizer or fuel may over a period of time contract the gas thereby lowering the bladder pressure below 200 p.s.i. Or the pressure may drop due to leakage. In any case, the pressure loss is made up by the supply of higher pressure gas from chamber 62.

Therefore, it will be seen that this invention provides a fluid pressurizing system that utilizes the fluid in the tanks as a pressurizing agent to automatically maintain the fluid at a constant pressure level in the tanks.

While a liquid oxidizer and a solid reactant such as carbon have been described as the chemical components for producing the gas pressurizing agent, it will be clear that other components could be used without departing from the scope of the invention, such as, for example, combining the fuel with a solid oxidizer. Also, while the invention has been illustrated in connection with a rocket engine, it will be clear to those skilled in the arts to which the invention pertains that it would have use in many installations other than that shown where an apparatus for pressurizing the fluid in a tank is desired, and that many changes and modifications may be made thereto without departing from the scope of the invention.

I claim:

A fuel tank pressurizing system comprising a tank filled with a fuel, a hollow casing surrounding one end of said tank forming a closed fluid chamber therebetween, a gas generator in said chamber containing a fuel reactant producing a gas when combined with said fuel, said generator having a fuel inlet and a gas outlet opening into said chamber, conduit means connecting the fuel in said tank to said inlet, fuel pumping means in said conduit means, actuating means to drive said pumping means, gas pressure responsive means in said chamber connected to said actuating means, said tank having an expandable closed gas compartment therein, means connected to said compartment and chamber for communicating the gas in said chamber to said compartment, said pressure responsive means being operable below a predetermined chamber gas pressure to effect actuation of said actuating means to drive said pumping means and deliver fuel to said gas generator, said generator discharging gas into said chamber and thence into said compartment to expand said compartment raising the pressure of said fuel in said tank, said pressure responsive means being operable upon the attainment of a predetermined chamber gas pressure to deactivate said actuating means to terminate the supply of fuel to said generator, said means connected to said compartment and chamber including pressure regulator means having an inlet connected to the gas in said chamber and an outlet connected to said compartment and being responsive to a predetermined gas pressure in said compartment to terminate the flow of gas thereto.

References Cited in the file of this patent

UNITED STATES PATENTS

| | | |
|---|---|---|
| 2,394,852 | Goddard | Feb. 12, 1946 |
| 2,701,441 | Mitchell | Feb. 8, 1955 |
| 2,926,492 | Flanagan | Mar. 1, 1960 |